United States Patent Office 3,721,733
Patented Mar. 20, 1973

3,721,733
ANTI-MICROBIAL COMPOSITIONS CONTAINING HISTAMINASE
Gerrit Hendrik van Leeuwen, Soesterengweg 2–4, Soestdijk, Netherlands
No Drawing. Continuation of application Ser. No. 827,151, May 23, 1969. This application Oct. 4, 1971, Ser. No. 186,546
Claims priority, application Netherlands, Oct. 24, 1968, 6815177
Int. Cl. A61k 19/00
U.S. Cl. 424—94        3 Claims

ABSTRACT OF THE DISCLOSURE

The present invention provides for the addition to anti-microbial compositions the enzyme histaminase. In addition to histaminase, other enzymes such as lypase, proteinase, peptidase and/or chondrosulphatase or admixtures of the same may be added to the composition. Other embodiments include the addition to the basic anti-microbial, histaminase composition of cystein-oxidase or glutaminase. It is preferable that the composition be prepared as a sterile, injectable composition in an ampoule.

---

This is a continuation of U.S. Ser. No. 827,151 filed May 23, 1969, now abandoned.

REFERENCES

Applicant claims priority under 35 U.S.C. 119 based upon Dutch patent application No. 6,815,177 filed Oct. 24, 1968 by the applicant herein.

The invention relates to pharmaceutical compositions which contain an anti-microbial substance, and a method of producing the same.

When human and microbial organisms are treated with practically any antibiotic or chemo-therapeutic composition to control infections by micro-organisms such as bacteria, viruses, fungi and the like, the organism develops a resistance to the composition. This resistance results, on the one hand, in part of the anti-microbial substance being neutralized by antibodies or anti-substances produced by the human reticulo-endothelial system (R.E.S.) so that an ever increasing dosage is required, or in an excessive sensitivity towards these medicines so that further administration is excluded. On the other hand, the infecting organisms produce antibodies or analogous substances which resist the anti-microbial substances combating them so that the infecting organisms develop a resistance, leading to immunity, against the medicines used.

For these reasons, anti-microbial substances such as allyl-thiocyanate, allyl-isothiocyanate, allyl-sulphide, di-allyl-sulphide, benzylthiocyanate, a number of sulphonates and derivative thereof and sulpho-oxides and halogensulphoxides which have extremely high germ-killing properties, have hitherto not been used because these substances, in general, give rise to very strong skin and tissue reactions.

I have now found that if the anti-microbial substance is administered together with the enzyme histaminase and, if necessary, one or more other enzymes, the aforesaid disadvantages are mitigated or avoided and particularly the reactions to the R.E.S. are substantially reduced or prevented so that the effect of the anti-microbial substance is markedly improved without other complications arising.

Accordingly, the invention provides a pharmaceutical anti-microbial composition which comprises an anti-microbial substance and histaminase.

I believe that the advantageous effects of the compositions of the invention may be accounted for by the rapid oxidative desamination of histamine.

It has furthermore been found that, if cystein-oxidase is included in the compositions, a further improvement is obtained which may be attributed to the disruption of peptide bonds so that growth is prevented.

Glutaminase may be included in the compositions to avoid an excessively high glutamine content, which may block a great number of cerebral functions. Furthermore, the enzymes lipase, proteinase, peptidase and/or chondrosulphatase may be added. These enzymes may be used separately or in any admixture without the addition of other substances in those cases in which the organism reacts allergically, hence by a defensive reaction to substances of an origin foreign to the body itself, for example, by allergy due to the penetration of pollen, which may be treated with a combination of histaminase, glutaminase and chondrosulphatase.

Since the enzymes have to be administered parenterally, the composition is preferably prepared in sterile injectable form and packed in doses suitable for injection, that is to say, preferably in glass ampoules. Any suitable physiologically acceptable carriers may be used.

It is furthermore possible to include in the compositions of the invention strongly acting, but irritating substances together with other medicines, for example, penicillin, which themselves produce secondary effects, in this case, fungus growth in the lungs, these secondary effects are now being avoided.

It is, of course, also possible to use other anti-microbial substances for avoiding side reactions, whilst the anti-microbial activity is increased.

Examples of anti-microbial substances suitable for use in accordance with the invention are:

(1) Alcohol-thiocyanates in general, sulphonates of glucose, fructose, other glucoses, aldehydes and ketones and furthermore, nitro-compounds of phenols and cresols.

(2) In addition thereto, as a main active component penicillin, to which one or more known components are added in order to avoid fungus growth produced by penicillin.

The invention covers, however, also all other antibotics.

In order that the invention may be more fully understood, the following examples are given by way of illustration only.

The first two examples describe two compositions of the invention. The further examples show the results obtained using these compositions. It has been found that, in all the test cases, no side reactions occurred due to the anti-microbial substances.

Example I

A composition A of the following formulation was produced and packing in glass ampoules of 2 mls. each:

| | |
|---|---|
| Allyl-thiocyanate | mgs./ml  2.5 |
| Benzyl-thiocyanate | mgs./ml  2.5 |
| Butyl-sulphonate | mgs./ml  5 |
| Histaminase | I.U./ml  0.5 |
| Cystein-oxidase | I.U./ml  1.0 |

Example II

A composition B of the following formulation was produced and packed in glass ampoules of 2 mls. each:

| | |
|---|---|
| Allyl-sulphide | mgs./ml  5 |
| p-Nitrophenol | mgs./ml  5 |
| Glutaminase | I.U./ml  2.5 |
| Histaminase | I.U./ml  2.5 |

Example III.—Rheumatoidal arthritis

Two patients in an acute stage of rheumatoidal arthritis were each treated with one ampoule of the composition A for six days. The erythrocyte sedimentation rate (E.S.R.) dropped within six days from 30 to 15. Arthritic pain and general discomfort vanished.

Example IV.—Herpes zoster

Two patients in whom the right hand part of the scrotum perianum and the thigh were affected with herpes zoster, were treated with one ampoule each of the composition A for three days with distilled water. In both cases, the infection disappeared.

With a 52-year-old woman suffering from this infection, two ampoules of the composition A were administered the first day and one ampoule of this composition every next day for two days. The skin disease vanished completely in three days.

Example V.—Influenza and bronchitis

A 34-year-old woman suffering from acute influenza and lung infections and having a temperature of 40° C. was treated with four injections of the composition A and cured.

A patient suffering from asthma with bronchitis and influenza was healed by a four-days' treatment with four injections of the composition A and two injections of the composition B.

A patient suffering from three influenza attacks within three weeks and showing paralysis and general muscular pain symptoms was cured by a six-days' treatment with one ampoule of the composition A, daily.

An older patient suffering from influenza and chronic bronchitis was cured by a six-days' treatment with one ampoule of the composition A, daily.

A 12-year-old child suffering for three years from chronic bronchitis with asthma was treated for five days with an ampoule of the composition A, daily. After three months, the infection did not recur.

A 73-year-old woman suffering from bronchitis who had been treated previously with a large number of antibiotics, was treated for four days with one ampoule of the composition A, daily. The bronchitis vanished.

A number of patients suffering from an acute influenza virus infection accompanied by high temperature was cured within 24 hours by the administration of one injection twice of the composition A.

A patient suffering from chronic, asthmatic bronchitis, with asthma attacks only with serious sinusitis and obturated nose, respiration through the nose being impossible, was cured within two days by two injections of the composition A, daily.

Example VI.—Whooping cough

An adult suffering constantly for three weeks from whooping cough was healed by three ampoules of the composition A.

A four-year-old child was treated for five days with one ampoule of the composition A, daily, after which the cough was suppressed.

Example VII.—Sinusitis

Six patients, three of whom suffered from acute sinusitis and three from long-term sinusitis, were cured by three to six injections of the composition A, the symptoms starting to vanish in all cases after only six hours.

A 27-year-old man suffering from chronic sinusitis was treated for seven days with one ampoule of the composition A, daily, after which all symptoms disappeared.

A 34-year-old patient suffering from an acute cold and serious headache above the left-hand eye, a completely obturated nose and high temperature, was treated in the evening with one injection of the composition A. The next morning, a further injection was given. The temperature had then returned to normal and the pain and cold had disappeared.

A 26-year-old man suffering from an acute cold and serious pain above the right-hand eye, an obturated nose, pressure and secretion of the upper, forenose sinus, right-hand side, was cured by three injections of the composition A, one ampoule daily.

A 14-year-old girl not yet having menstruation and suffering from suppurating irritation of the vulva, was healed by three injections of the composition A, one ampoule daily.

Example VIII.—Vaginitis and purulent leucorrhoe

A patient suffering from an infection due to trichomonas and monilia was completely cured after six injections of the composition A.

Example IX.—Virus pneumonia

Three cases of acute attack at a temperature of 40° C. were all cured within a week by five to six injections of the composition A.

Example X.—Ulcerative stomatitis

A patient showing at the beginning of the olimacterium symptoms of acute infection at the mouth, with the later formation of blisters also on the lips, whilst crusts were formed, was cured after six days by a daily injection of the composition A.

Example XI.—Colonitis

A 42-year-old woman who had colonitis complaints for a whole year, suffering from a swollen large intestine and flatulence, and sometimes diarrhea and mucus, and to whom a diet and internal antibiotics had given no relief, did not have any complaints after two weeks' treatment with two injections of the composition A, per week.

Example XII.—Angina

A 24-year-old man who suffered for the third time within half a year from a serious angina with swollen throat and high temperature, was cured after three days by a daily injection of the composition A, being very much improved after the second day. (The preceding attacks took ten days.)

Example XIII.—Infection of the bocal cavity

A 62-year-old woman suffering for four years from a mouth infection accompanied by blisters and very painful ulcera on the tongue and the tip of the tongue, the woman having a prosthesis which she could hardly keep in her mouth due to much pain, had been in hospital for four years. The infection was caused by an unknown virus. No conventional treatment was successful in these four years, either by antibiotics or tampons.

The following treatment with the composition A was carried out for one month:
For two weeks: one injection, three times a week.
For one week: one injection, twice a week.
For two weeks: one injection a week.
The infection disappeared completely.

Example XIV.—Tuberculosis

A 72-year-old woman who had been, in former years, in a sanatorium and who had been for the rest of her life under the constant supervision of physicians and consultants because of recurring lung infections and tuberculosis and who sometimes suffered from bronchitis, not specifically due to scars and bronchictasis, suffered in spite of annual influenza vaccinations several times from more or less serious attacks of broncho-lung infections.

With such a broncho-lung infection on the left below at the back with an injection the size of a hand, and acute pains at the side with temperatures of 38.5 to 40° C., four injections of the composition A were used, one injection daily, after which the complications disappeared completely and coughing was reduced by half.

A 31-year-old woman had for some months a swollen abdomen with strong vaginal secretion. After menstruation, which was more painful than normal, the complaints increased.

A gyneocological examination was carried out by a specialist. Probably a non-specific infection of the right-hand adnexd glove with painful pressure of the uterus was involved.

One injection daily of the composition A was given, in total, three injections, after which the complaints disappeared completely.

The terms and expressions which are employed are used as terms of description; it is recognized, though, that various modifications are possible.

Having thus described certain forms of the invention in some detail, what is claimed is:

1. An aqueous anti-microbial composition comprising per milliliter:
   (i) 2.5–5 mg. of at least one of an anti-microbial agent selected from the group consisting of allyl thiocyanate, benzyl thiocyanate, butyl sulfonate, allyl sulfide and p-nitrophenol,
   (ii) 0.5–2.5 I.U. histaminase, and
   (iii) 1.0–2.5 I.U. of an enzyme selected from the group consisting of cystein oxidase and glutaminase.

2. An aqueous anti-microbial composition according to claim 1 comprising per milliliter:
   2.5 mg. allyl thiocyanate,
   2.5 mg. benzyl thiocyanate,
   5 mg. butyl sulfonate,
   0.5 I.U. histaminase, and
   1.0 I.U. cystein oxidase.

3. An aqueous anti-microbial composition according to claim 1 comprising per milliliter:
   5 mg. allyl sulfide,
   5 mg. p-nitrophenol,
   2.5 I.U. glutaminase, and
   2.5 I.U. histaminase.

No references cited.

RICHARD L. HUFF, Primary Examiner

U.S. Cl. X.R.

424—302